United States Patent [19]

Winter et al.

[11] 3,930,208

[45] Dec. 30, 1975

[54] A-C SIGNAL PROCESSING CIRCUITS FOR COMPANDORS

[75] Inventors: James Douglas Winter, Ottawa; Mark Alexander Elder, Carp, both of Canada

[73] Assignee: Northern Electric Company Limited, Montreal, Canada

[22] Filed: Aug. 29, 1974

[21] Appl. No.: 501,492

[52] U.S. Cl. .................... 333/14; 325/65; 330/132; 330/134

[51] Int. Cl.[2] ............................................ H04B 1/64

[58] Field of Search ...... 333/14, 17, 81 R; 330/132, 330/134; 179/1 D, 1 VC, 1 VL; 325/62, 65

[56] References Cited

UNITED STATES PATENTS

| | | | |
|---|---|---|---|
| 2,054,657 | 9/1936 | Mayer | 333/81 R X |
| 3,119,077 | 1/1964 | Saari | 333/17 X |
| 3,795,876 | 3/1974 | Takahashi et al. | 333/14 |

FOREIGN PATENTS OR APPLICATIONS

| | | | |
|---|---|---|---|
| 951,058 | 3/1964 | United Kingdom | 330/134 |

*Primary Examiner*—Paul L. Gensler
*Attorney, Agent, or Firm*—John E. Mowle

[57] ABSTRACT

An a-c signal processing circuit, for use in compandors, includes variolossers arranged in series. A network associated with each variolosser restricts the operation of each variolosser to a particular band of frequencies. Signals outside the band of frequencies are passed with a constant degree of loss by the variolosser. Each variolosser is controlled by a control circuit which is responsive to the amplitude envelope of signals having frequencies within the operational band of the associated variolosser. When the signal processing circuit is used to provide compression and expansion functions in a plural band compandor, phase shift introduced into signals having frequencies near the operational limits of one frequency restrictive means, in the compressor, is substantially corrected by complementary phase shift introduced in the expandor. Further, signal cancellation and reinforcement is avoided. Hence output signals from the compandor are of improved fidelity.

13 Claims, 18 Drawing Figures

A-C SIGNAL PROCESSING CIRCUITS FOR COMPANDORS

The present invention relates to compressor expandor circuits to provide a plural band compandor for processing alternating current signals.

Often in combination with signal transmission facilities, signal storage facilities and the like, a compressor circuit is used to reduce the dynamic range of the a-c signals connected to the facility. At the output of the facility, an expandor circuit is used to restore the a-c signals to their original form. The combination of a compressor, followed by an expandor, is known as a compandor. A signal processing circuit which includes a variolosser, is used to provide both compressor and expandor circuits.

Compandors have been used for many years to reduce the effects of noise, particularly in audio circuits. Compandors can provide up to 25 decibels of idle noise improvement in addition to a lesser but significant subjective improvement.

A single band compandor is one which is effective across the entire operating passband frequency range of the associated circuit facility. In the operation of the single band compandor the highest signal level at any one frequency governs the gain of the compressor and the expandor across the entire passband. Hence low level signals at other frequencies may as a result have poor signal-to-noise ratios.

Alternately, to provide a plural band compandor, a number of narrow band compressors and expandors have been used, arranged in parallel to provide the required passband companding effect. The passband frequency is split up into a number of bands, with each band compressed by an associated compressor. The outputs from the compressors are summed and applied to the associated circuit facility. Signals from the circuit facility are again split into a like number of frequency bands and applied to a similar arrangement of expandors. The outputs from the expandors are summed to provide a reconstruction of the original signals in the overall passband. The control for each of the compressors and expandors is derived according to the signals in each of their isolated frequency bands respectively. Hence each of the narrow bands tends to have a significantly improved signal-to-noise ratio. After the narrow bands are summed together at the outputs of the expandors, the signal-to-noise ratio demonstrates an improvement over that available from the single band compandor. There are however some problems associated with present compandors similar to that just described.

Firstly, in order to split the passband into narrow frequency bands, filters are used which inherently introduce phase shift and delays. Hence the signals in each band become somewhat distorted. There is always of necessity an overlap or crossover region between the narrow bands where signals of the same frequencies will pass into two sections of the compressor or expandor at about the same amplitude. When recombined, these signals may be of such phase as to either reinforce or cancel. This is a source of distortion.

Secondly, when a signal at or near the crossover frequency, between the two bands, is present together with a higher level signal, for example a lower frequency signal, the signal at the crossover frequency will experience the most gain in the higher band compressor and later in the lower band expandor. As these gains are very seldom complementary, a significant level error, relative to the other signals, results at the output of the compandor. This is a further source of distortion.

Multiband compandors as described above are generally satisfactory, despite their disadvantages, in a wide range of applications. However, in instances where a series of compandors are required in combination with circuit facilities, for example in an extensive radio broadcasting network, the well known multiband compandor typically causes significant audible signal distortion. On the other hand, in the absence of any sort of compandor, the circuit facility provides a poor signal-to-noise ratio and in addition can be unduly susceptible to crosstalk interference from other adjacent transmission facilities or circuits.

The present invention provides an improved plural band signal processing circuit for compressing or expanding signals. At least two variolossers are connected in tandem between input and the output ports, so that an input signal is processed serially first by one variolosser and then by the on-following variolosser. Each variolosser includes means for limiting the frequency range over which the variolosser is effective. At other frequencies each variolosser has nearly constant loss or gain. A control unit is associated with each variolosser and is responsive only to signals being processed which are substantially within the effective frequency range of its associated variolosser. The frequency ranges of the variolossers are contiguous one another so that any frequency within the passband of the circuit will be compressed or expanded by at least one variolosser.

When the signal processing circuit, providing a compression function, is connected in series with the similar but complementary signal processing circuit, providing an expansion function, an improved companding function is obtained. Phase shift introduced into signals having frequencies near the operational limits of one frequency restrictive means, in the compressor, is substantially eradicated or corrected by complementary phase shift introduced in the expandor. Further, signal cancellation and reinforcement is avoided. Hence output signals from the compandor are of improved fidelity.

The present invention is an alternating current signal processing circuit, for use in a compandor and comprises a plurality of variolossers arranged in series. Each variolosser has a variable gain characteristic in a separate and distinct operational band of frequencies. Frequencies outside of the operational band pass through the variolosser with nearly constant gain. A separate control unit is associated with each variolosser and generates a control signal for controlling the associated variolosser. Each control unit is responsive to alternating current signals applied to the variolossers and having frequencies in the corresponding separate and distinct operational band of frequencies of the variolosser associated therewith. A buffer means interconnects the variolossers in tandem and provides for impedance isolation.

Example embodiments of signal processing circuits incorporating the present invention are described in the following, with reference to the accompanying drawings in which.

Figure 7:
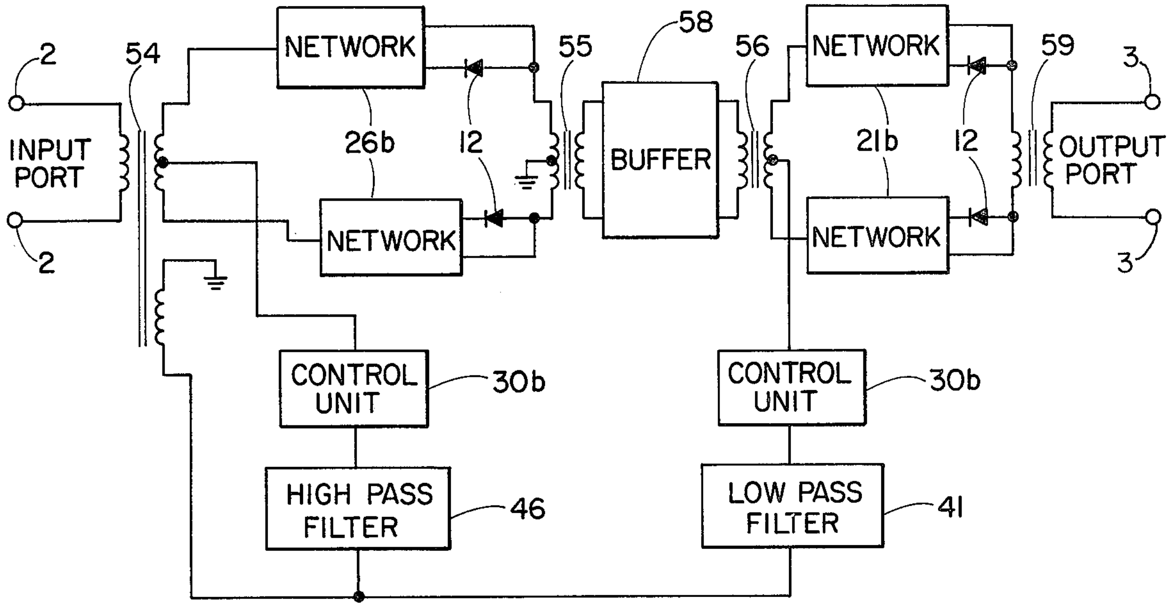
FIG. 7 is a block schematic diagram of a substantially passive two-band balanced expandor circuit.
Figure 10:
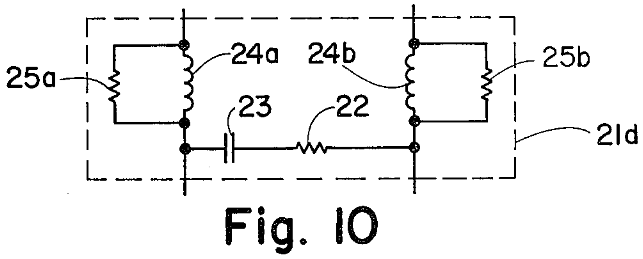
Figure 11:
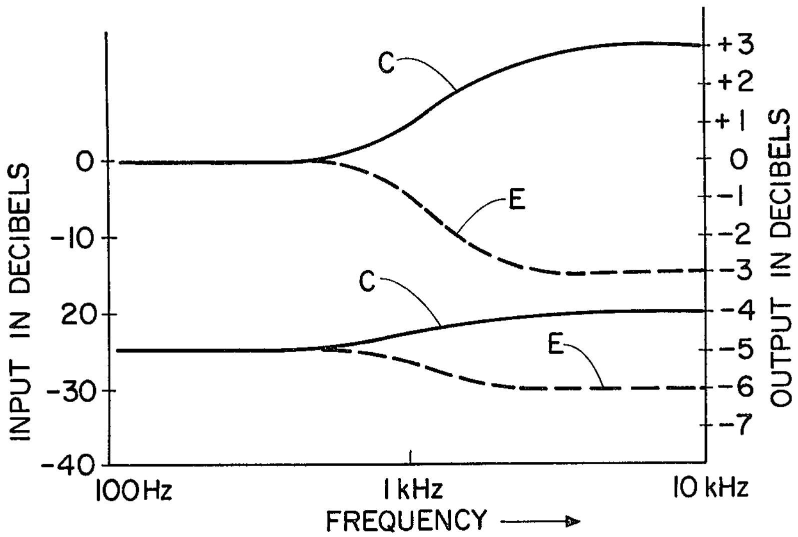
Figure 8:
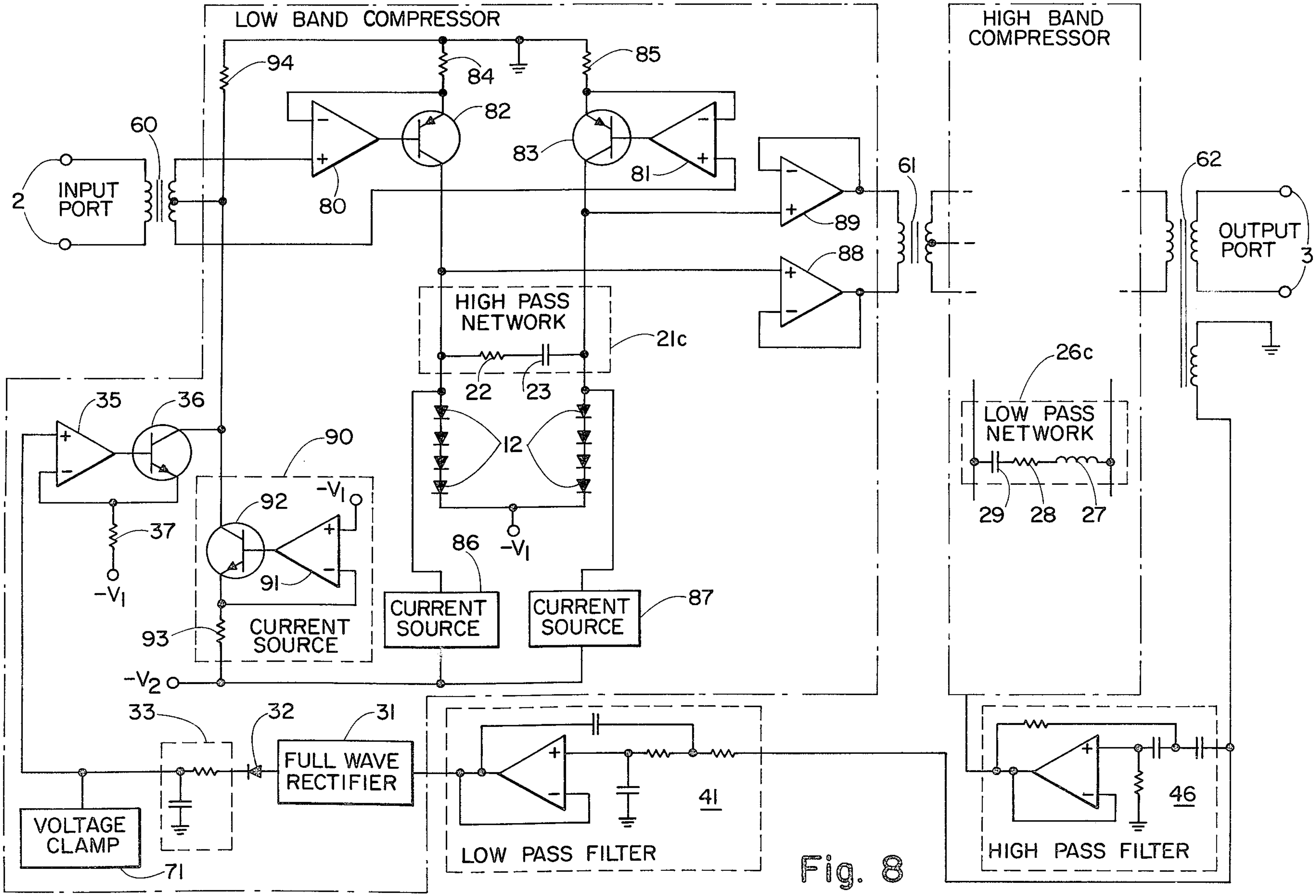
FIG. 8 is a schematic diagram of an active two-band balanced compressor circuit.
Figure 9:
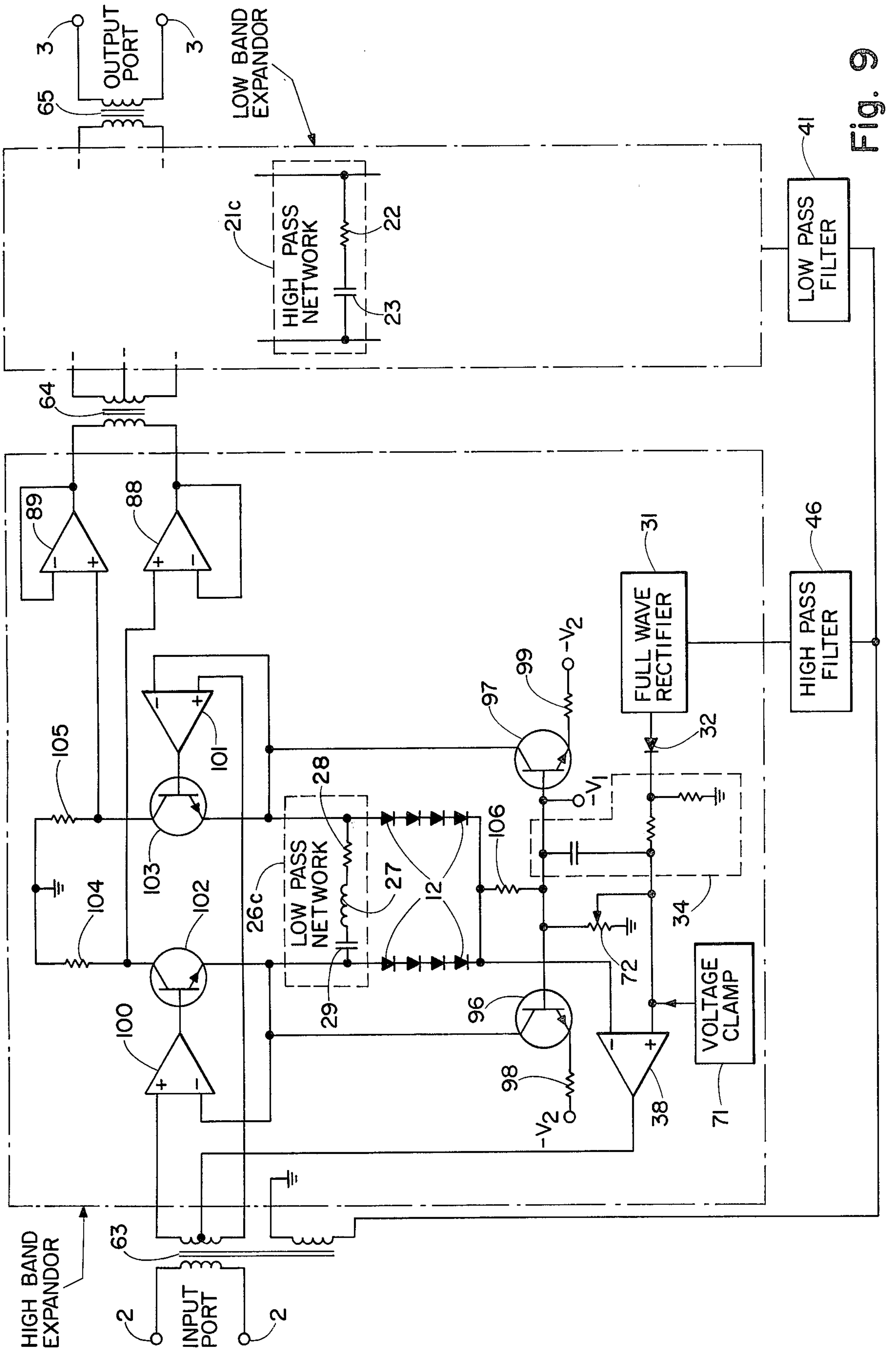
FIG. 9 is a schematic diagram of an active two-band expandor circuit.
Figure 12:
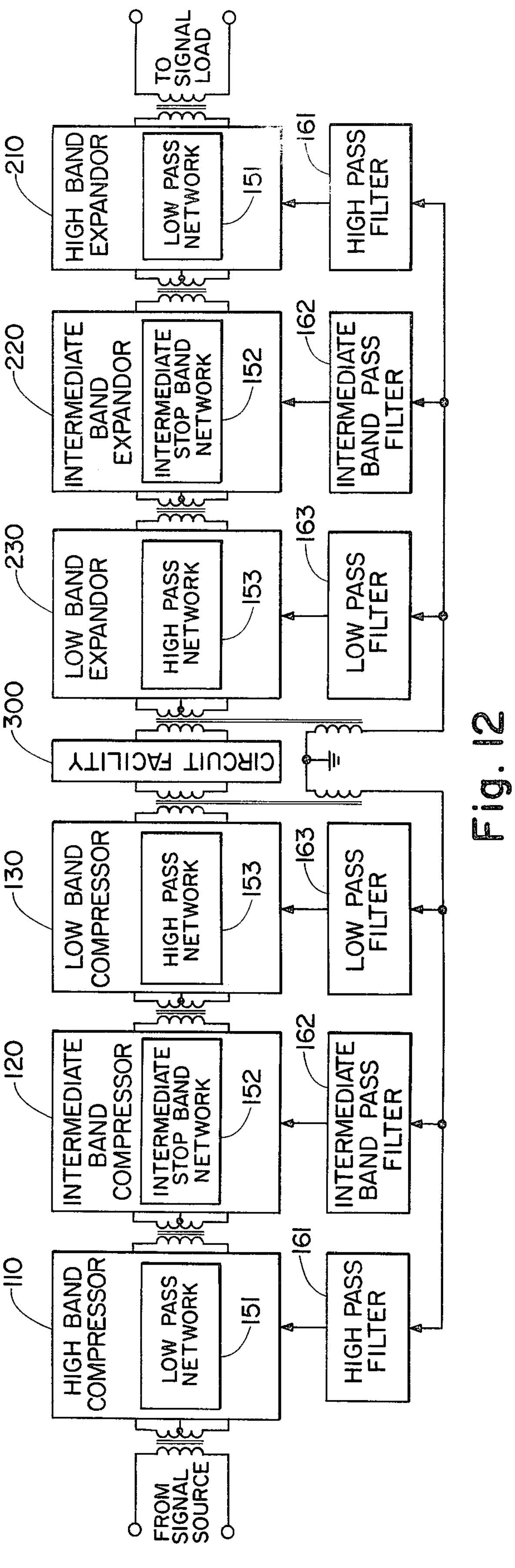

FIG. 10 appears on the same sheet as FIG. 7 and is a schematic diagram of a modified network, optionally applicable to the circuits in FIGS. 8 and 9;

FIG. 11 appears on the same sheet as FIG. 7 and is a graphical representation of the operation of the circuits in FIGS. 8 and 9 with the modified network in FIG. 10;

FIG. 12 is a block diagram of a three-band compandor;

FIGS. 13A through 13F are graphical representations of the operation of various parts of the circuit in FIG. 12.

Figure 1:
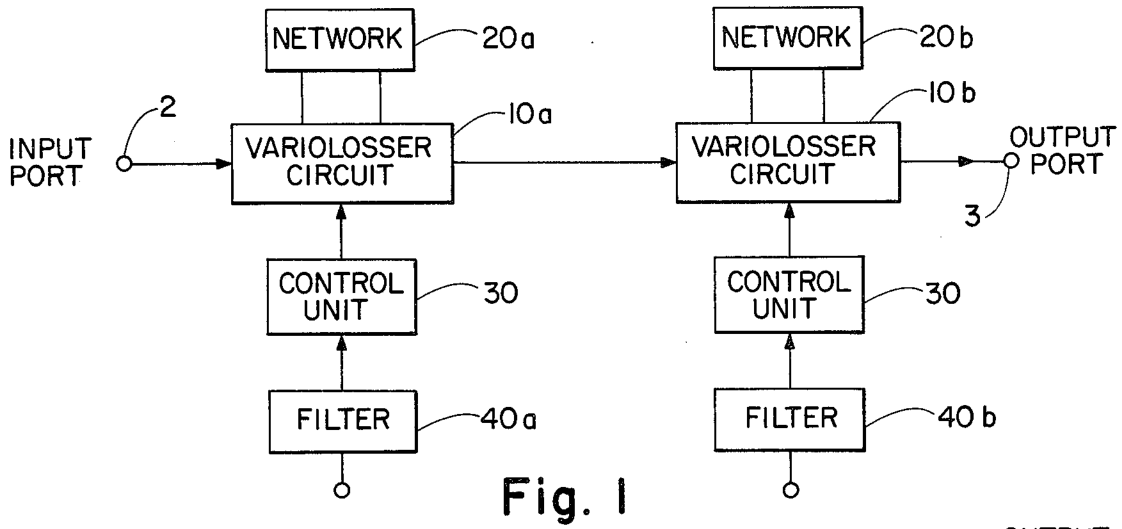
FIG. 1 is a block diagram of a two-band signal processing circuit for altering the dynamic range of an alternating current signal.

Referring to FIG. 1 of the drawings, a pair of variolosser circuits 10*a* and 10*b* are connected in tandem between an input port 2 and an output port 3. Frequency selective networks 20*a* and 20*b* are connected to the variolosser circuits 10*a* and 10*b* respectively. A control circuit comprises a pair of control units 30, each control unit 30 having an output connected to the control input of one of the variolosser circuits. A pair of filters 40*a* and 40*b* each have an input for connection of signals thereto and each includes an output connected to the input of one of the control units 30. The passbands of the filters 40*a* and 40*b* are arranged to generally correspond with the frequency stopband characteristics of the corresponding networks 20*a* and 20*b* respectively. The inputs of the filters 40*a* and 40*b* are connected to either the input port 2, the output port 3 or immediately preceding or following its associated variolosser and in accordance with the response of the control units, and the degree of compression or expansion desired.

For example, when the input of the filters 40*a* and 40*b* are connected to the output port 3, the control units 30 each respond to signals as selected by the filters 40*a* and 40*b*, to provide control signals at the control inputs of the variolosser circuit 10*a* and 10*b* respectively. The impedances of the variolosser circuits 10*a* and 10*b* are then controlled to provide a degree of attenuation or gain, as the case may be, in their operational bands of frequencies as determined by the associated networds 20*a* and 20*b*. Frequencies outside the operational band of either variolosser are passed with a substantially constant amount of insertion loss. In the case where, for example, the gain of a variolosser circuit is low in response to a large signal at the output of its associated filter, and high in response to little or no signal at the output of its associated filter, a signal compressing function is obtained. An opposite or complementary operation provides a signal expanding function.

Figure 2:
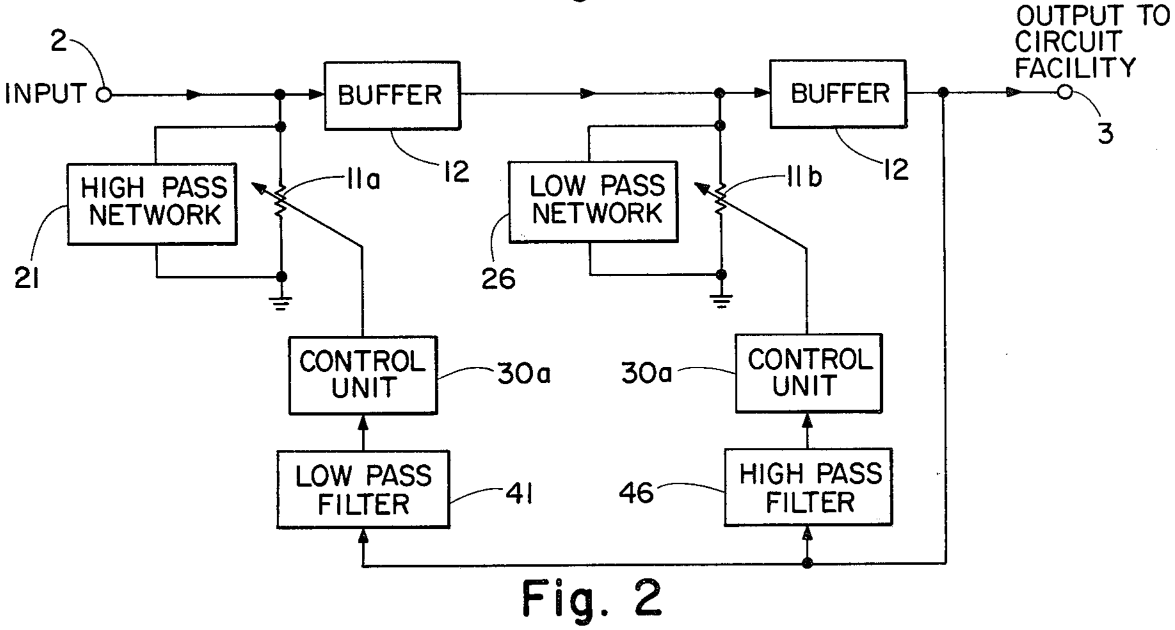
FIG. 2 is a block diagram of the circuit in FIG. 1, arranged as a compressor to provide a signal dynamic range compressing function.

Referring to FIG. 2, the variolosser circuits 10*a* and 10*b* in FIG. 1 are provided by controllable resistance elements 11*a* and 11*b* and buffers 12. The element 11*a* is connected between the input port 2 and a common terminal illustrated as ground. One buffer circuit 12 has its input connected to the port 2. A high pass network 21, associated with the element 11*a*, is connected in parallel with it. The other element 11*b* is connected between ground and a junction of the output of the one buffer 12 and the input of the other buffer 12, the output of which is connected to the output port 3. A low pass network 26 associated with the other element 11*b* is connected in parallel with it. Each controllable resistance element includes a control input to which is connected the output of an associated control unit 30*a*. The inputs of low pass and high pass filters 41 and 46 are connected to the output port 3. The combination of the one element 11*a*, the high pass network 21 and the one buffer 12 provide a non-linear low band or low fequency variolosser. The combination of the other element 11*b*, the low pass network 26 and the other buffer 12 provide a non-linear high band or high frequency variolosser.

Figure 4:
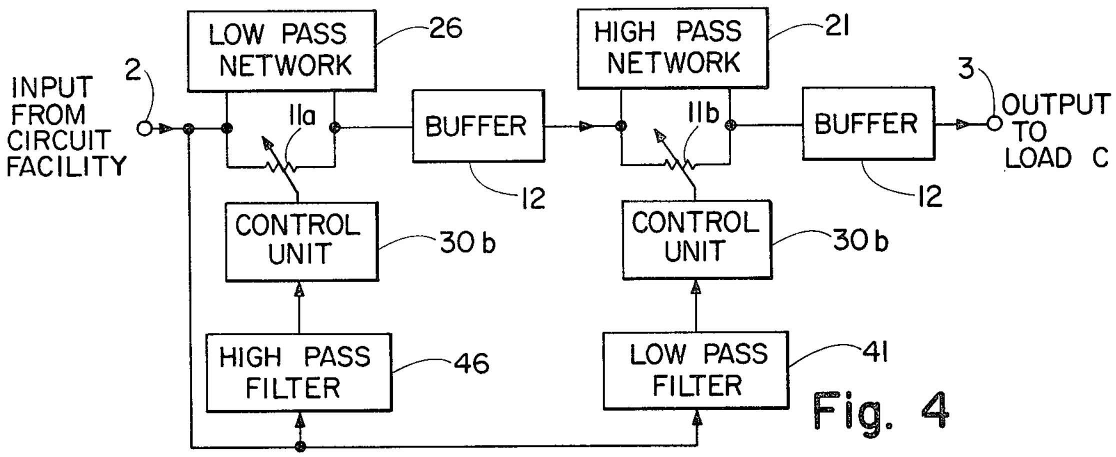
FIG. 4 is a block diagram of the circuit in FIG. 1 arranged as an expandor to provide a signal dynamic range expanding function.

The expandor circuit in FIG. 4 is constructed with the same elements as the compressor in FIG. 2. However in this case the inputs of the filter 41 and 46 are connected to the input port 2. Further, one controllable resistance element 11*a* is connected between the port 2 and the input of the one buffer 12, in parallel with the low pass network 26. The other element 11*b* and the high pass filter 21 are likewise is parallel arrangement between the output of the one buffer and the input of the other buffer.

In operation of the compressor circuit in FIG. 2, signals appearing at the output port 3 are selectively filtered by the low pass filter 41. The associated control unit 30*a* controls the low band variolosser and in particular the resistance of the element 11*a* to provide a low resistance in response to a high signal level from the filter 41 and to provide a higher resistance in response to a lower signal level from the filter 41. Hence, lower input frequency signals are attenuated according to the resistance of the element 11*a* while the high pass network 21 provides a majority of the attenuation for higher frequency signals. The impedance of the network 21, in its pass band, is usually much lower than the resistance of the element 11*a*, except in cases of extremely high level signal. Hence the attenuation of higher frequency signals is generally contant with the attenuation of the lower frequency signals being variable. The buffer 12 isolates the element 11*a* and network 21 from the element 11*b* and the lower pass network 26.

The operation of the element 11*b* and the low pass network 26 is in essence the same as described above, except that the other control unit 30*a* responds to signals in a higher frequency band as determined by the high pass filter 46 and the lower signal frequencies at the output of the one buffer 12 experience a substantially constant degree of attenuation, according to the pass band impedance of the low pass network 26. The higher frequency signals are variably attenuated by the element 11*b*. The other buffer 12 provides isolation between the high band variolosser and the output port 3.

Figure 3:
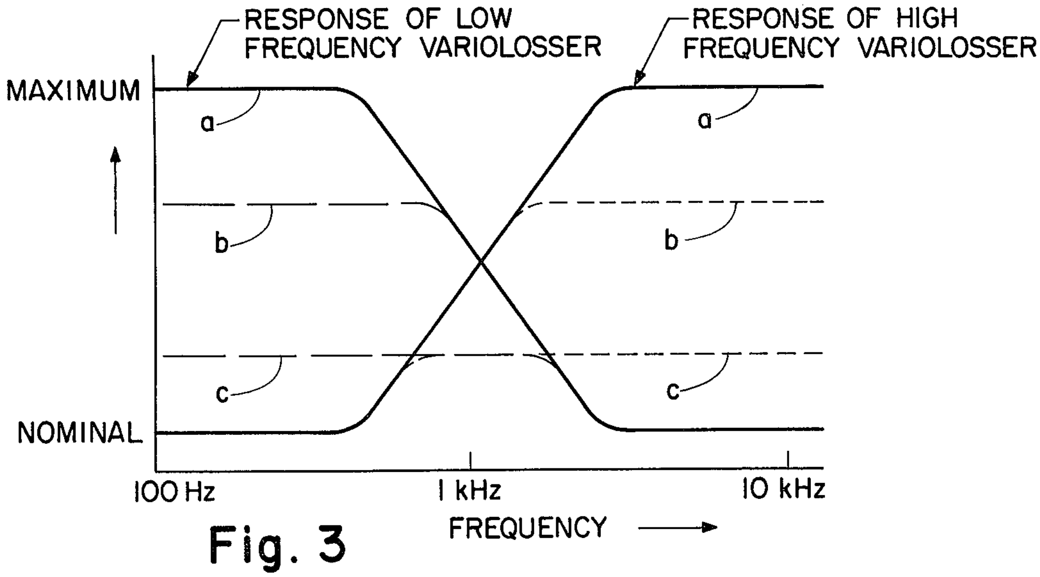
FIG. 3 is a graphical representation of the operation of the compressor in FIG. 2.

Referring to FIG. 3, the vertical axis of the graph represents gain on a non-linear scale, for example in decibels, and the horizontal axis represents input signal frequency also on a non-linear scale. Curves labelled *a*, *b* and *c* on the left-hand side represent an exemplary low frequency variolosser response in cases of *a* low level, *b* intermediate level and *c* high level sweep frequency signals applied to the low frequency variolosser in FIG. 2. Curves labelled *a*, *b* and *c* in the right-hand side of the graph represent an exemplary response to the same signals applied to the high frequency variolosser in FIG. 2. The right-hand and left-hand curves *a*, *b* and *c* each include upper and lower horizontal portions and sloping portions. The upper horizontal portions of the curves occur at frequencies where the associated networks have virtually no attenuating effect. The lower horizontal portions of the curves occur at freqencies where the associated networks substantially determine the degree of attenuation. The high pass filter 46 and the low pass filter 41 have roll-off characteristics arranged to intersect at about the same frequency as do the curves in FIG. 3, to provide satisfactory control signals for the respective variolossers.

In the operation of the expandor in FIG. 4, the compliment of the compression function just described is provided. When the compressor in FIG. 2 is connected in series with the expandor in FIG. 4, the signals at the output of the expandor are ideally undistinguishable from those applied at the input of the compressor, except for relative signal magnitude and some constant phase delay, i.e. constant for all frequencies.

The filters 46 and 41 and networks 26 and 21 are the same in both FIGS. 2 and 4 and hence the above discussion regarding these elements generally applies to FIG. 4 also.

The combination of the low pass network 26 and the element 11*a* provides a high frequency or high band variolosser. The remaining high pass network 21 and the element 11*b* providing a low frequency or low band variolosser. In the high frequency variolosser, low frequency signals are passed to the input of the one buffer 12 with nominal attenuation, with attenuation of the higher frequency signals being determined by the resistance of the resistance element 11*a*. The following low frequency variolosser provides regulated attenuation of the lower frequencies while higher frequencies are passed with nominal gain.

Figure 5:
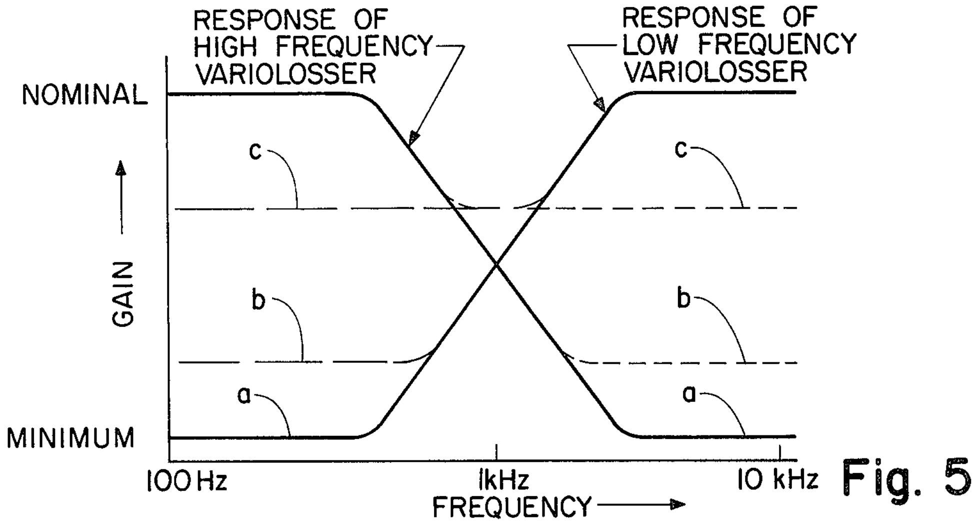
FIG. 5 is a graphical representation of the operation of the expandor in FIG. 4.

Exemplary operational characteristics of the expandor in FIG. 4 are illustrated in FIG. 5. The graph includes a vertical axis representing gain as a non-linear scale, and a horizontal axis representing frequency in a non-linear scale. The input signals are the same as those used in FIG. 3. It will be noted in comparison that the signal processing is the compliment of that shown in FIG. 3.

The combination of the compressor in FIG. 2 followed by the expandor in FIG. 4 provides a compandor. It is well known that a circuit facility, for example an audio transmission circuit or magnetic tape storage medium, inserted between the compressor and the expandor is required to accommodate signals of a reduced dynamic range than would otherwise be the case.

The roll off characteristics of the respective networks 21 and 26 should be generally symmetrical, in compliment. The effective beginning of each roll off characteristic generally corresponds in frequency with the effective end of the opposite roll off characteristic, with the roll off characteristics traversing each other at an intermediate point. In operation this provides companding action to all passband freqencies.

The controllable resistance circuit elements 11*a* and 11*b* in each case may be provided by linear or non-linear components, for example, components such as simple diodes or field effect transistors or combination of components in more complex circuitry. Correspondingly, the control units 30*a* and 30*b* may be linear or non-linear depending upon the characteristics of the associated resistance element and may be responsive to provide control signals related to, for example, the average, RMS, or peak values of signals received from the respective filters.

The circuit in FIG. 2 requires that the signal source be of a high impedance and the circuit in FIG. 4 requires that the signal source by of low impedance. However, these requirements may be relaxed by inserting buffer elements having appropriate output impedances in series with the input port 2.

Figure 6:
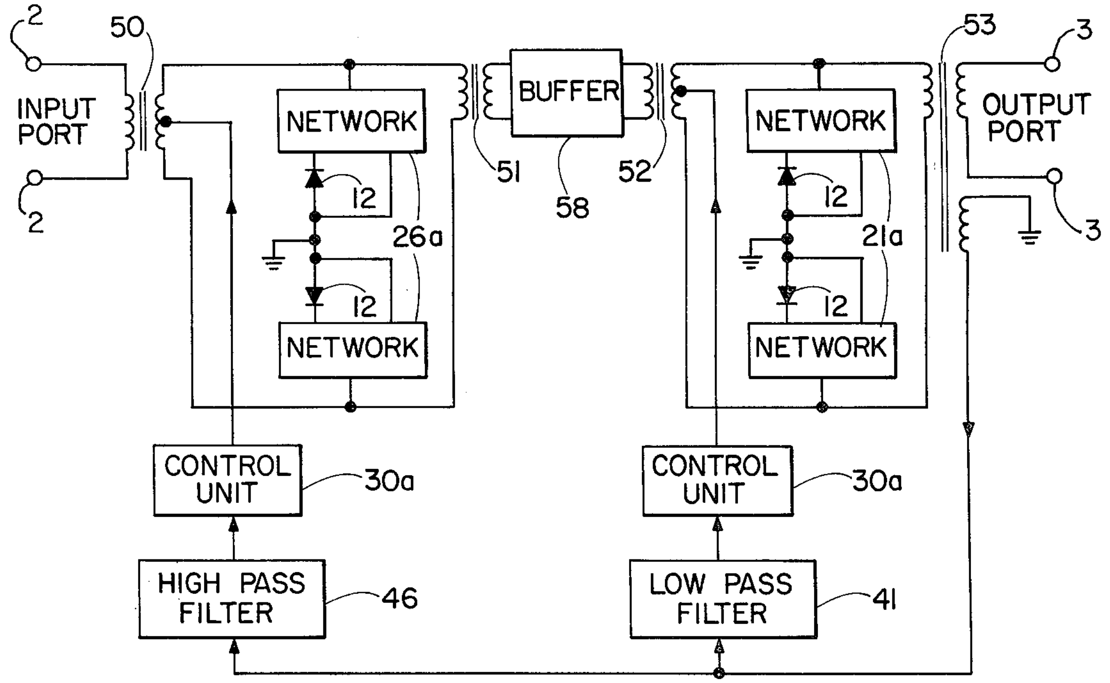
FIG. 6 is a block schematic diagram of a substantially passive two-band balanced compressor circuit.

Diodes, as variolosser elements, are often used in a balanced circuit, so that the harmonic distortion which would be experienced in a single diode variolosser is balanced out. FIGS. 6 and 7 include diodes in variolosser circuits which are of the balanced type and arranged in series. The diodes provide the above discussed resistance element function.

Referring to FIG. 6, an input port 2 is connected to the primary winding of a coupling transformer 50. The secondary winding of the transformer 50 is connected across the primary winding of a coupling transformer 51, the secondary winding of which is connected to the input of a buffer 58. The output of the buffer 58 is connected across the primary winding of a coupling transformer 52. The secondary winding of the coupling transformer 52 is connected to the primary winding of a coupling transformer 53, the secondary winding of which is connected to an output port 3. The coupling transformer 53 also includes a tertiary winding connected between ground and the input of high pass and low pass filters 46 and 41. Control units 30*a* are associated with each of the filters 46 and 41. One control unit 30*a* is connected between the high pass filter 46 and a centertap on the secondary winding of the coupling transformer 50. The other control unit 30*a* is connected between the low pass filter 41 and a centertap on the secondary winding of the coupling transformer 52.

A high band variolosser circuit is connected in shunt across the secondary and primary windings of the coupling transformers 50 and 51 respectively. The high band variolosser circuit is provided by a pair of networks 26*a*, each having an input terminal providing the shunt connection. The networks 26*a* each include an output terminal connected to ground and an output terminal connected to the anode electrode of one of a pair of diodes 12. The cathode electrodes of the pair of diodes 12 are connected to ground.

A low band variolosser circuit is connected in shunt across the secondary and primary windings of the coupling transformers 52 and 53 respectively. The low band variolosser circuit is provided by a pair of networds 21*a*, each having an input terminal providing the shunt connection. The networks 21*a* each include an output terminal connected to ground and an output terminal connected to the anode electrode of one of another pair of diodes 12. The cathode electrodes of the other pair of diodes 12 are connected to ground.

In operation of the high band variolosser the networks 26*a* operate to provide a generally constant shunt impedance for signal frequencies lower than the pass band of the high pass filter 46. Signal frequencies generally in the region of the passband of the highpass filter 46 are attenuated according to the impedance of the one pair of diodes 12. Signals received by the one control circuit 30*a* from the tertiary winding of the transformer 53 via the filter 46, cause a current in relation thereto to be conducted by the one control circuit 30*a*. The current controls the impedance of the one pair of diodes 12 in a well known manner and is drawn from ground via the one pair of diodes 12, the networks 26*a* and the centertap on the secondary winding of the transformer 50.

The operation of the lowband variolosser is similar to that of the high band variolosser. However in this case the networks 21 provide a generally constant shunt impedance for signal frequencies higher than the passband of the low pass filter 41, with the other pair of diodes 12 providing a controllable attenuation of the signal frequencies generally falling in the area of the passband of the filter 41.

The networks 26*a* and 21*a* and filter 41 and 46 are shown only in block form as it is well within the capability of those skilled in the art to provide, by various means and circuit configuration, the required filters and networks.

Referring to FIG. 7 an input port 2 is connected to the primary winding of a coupling transformer 54. The secondary winding of the coupling transformer 54 is connected to the primary winding of a coupling transformer 55 via a pair of networks 26*b*. A centertap on the primary winding of the transformer 55 is connected to ground. a pair of diodes 12 are each connected via their cathode electrodes to one of the networks 26*b* and via their anode electrodes to the junctions between their associated networks 26*b* and the primary winding of the transformer 55. The networks 26*b* in combination with the diodes 12 provide a high frequency variolosser.

The secondary winding of the coupling transformer 55 is connected to the input of a buffer 58. The output of the buffer 58 is connected to the primary winding of a coupling transformer 56. The secondary winding of the transformer 56 is connected via highpass networks 21*b* and another pair of diodes 12 to the primary winding of a coupling transformer 59, to provide a circuit configuration similar to that just described in conjunction with the networks 26*b*.

A tertiary winding of the transformer 54 is connected between ground and the inputs of high pass and low pass filters 46 and 41. A control unit 30*b* is connected between the output of the high pass filter 46 and a centertap on the seconary winding of the transformer 54. Another control unit 30*b* is connected between the low pass filter 41 and a centertap on the secondary winding of the transformer 56.

In operation the expandor circuit in FIG. 7 is ideally the exact inverse of the operation of the compressor circuit in FIG. 6. In this case the control units 30*b* each develop a control voltage in proportion to signals received from the transformer 54 and filtered by the associated filters 46 and 41. The networks 26*b* provide a substantially contant coupling impedance between the transformers 54 and 55, for signals having frequencies generally outside the pass band of the high pass filter 46. The diodes vary the coupling of signals having frequencies generally within the pass band of the filter 46, according to the direct current flowing in the diodes as determined by the voltage developed by the associated control unit 30. Hence a high band expandor is provided. The networks 21*b* reside in a low band expandor which operates on the same principles as the above described high band expandor, and in the light of the foregoing description are not further discussed.

The networks 26*b* and 21*b* should essentially have the same operating characteristics as the networks 26*a* and 21*a* in order that a satisfactory companding function be obtained. Preferably, the corresponding networks 26*a* and 26*b* are of similar construction as also are the corresponding networks 21*a* and 21*b*. Filters and networks, as in the case of FIG. 6 when applied to FIG. 7 will yield expandor circuit operating characteristics similar to the general operating parameters illustrated in FIG. 5.

Referring to FIGS. 8 and 9, low pass filters 41 and high pass filters 46 are provided by well known active second order filter circuit configurations.

In FIG. 8 the low band compressor is identical to the high band compressor except for the illustrated differences in networks 21*c* and 26*c*. In the low band compressor, the non-inverting inputs of differential amplifiers 80 and 81 are connected to opposite ends of the secondary winding of a coupling transformer 60, the primary winding of which is connected to an input port 2. The outputs of the amplifiers 80 and 81 are connected to base electrodes of transistors 82 and 83 respectively. The emitter electrodes of the transistors 82 and 83 are connected to the inverting inputs of the amplifiers 80 and 81 respectively, and to ground via resistors 84 and 85 respectively. A series of four diode elements 12 is connected, in series aiding configuration, between each of the collector electrodes of the transistors 82 and 83, and a minus D.C. voltage supply $-V_1$. The collector electrodes of the transistors 82 and 83 are also connected to current sources 86 and 87 which in turn are connected to a minus D.C. voltage supply $-V_2$, of a more negative potential than the supply $-V_1$. The collector electrode of the transistor 82 is also connected to the non-inverting input of a differential amplifier 88. The inverting input of the amplifier 88 is connected to its output which is also connected to one end of the primary winding of a coupling transformer 61. The collector electrode of the transistor 83 is also connected to the non-inverting input of a differential amplifier 89. The inverting input of the amplifier 89 is connected to the output of the amplifier 89 and to the other end of the primary winding of the transformer 61.

In the low band compressor a resistor 22 and a capacitor 23 are connected in series between the collector electrodes of the transistor 82 and 83 and constitute a high pass network 21*c*. In the corresponding high band compressor a low pass network 26*c* replaces the network 21*c* and comprises in series, a capacitor 29, a resistor 28 and an inductor 27.

The secondary winding of the transformer 60 includes a centertap connected to ground via a resistor 94 and to the output terminal of a current source 90. The current source 90 includes a differential amplifier 91 having a non-inverting input connected to the supply $-V_1$ and an output connected to the base electrode of a transistor 92. The emitter electrode of the transistor 92 is connected to the inverting input of the amplifier 91 and to the supply $-V_2$ via a resistor 93. The collector electrode of the transistor 92 provides the current source output terminal. The circuitry providing the current source 90 is duplicated to provide the current sources 86 and 87 with the resistors 93 being closely matched.

In the high band compressor, the circuitry of the low band compressor is utilized with the networks 21*c* replaced by the network 26*c*. Also in this case the circuit is coupled to the output of the low band compressor via the coupling transformer 61 and to the output port 3 via the coupling transformer 62.

In each of the low and high band compressors a control circuit is provided by a full wave rectifier 31 having an input connected to the output of filter 41 or 46, as the case may be. The output of the rectifier 31 is connected via a diode 32 and a smoothing circuit 33 to the non-inverting input of a differential amplifier 35 and to a voltage clamp 71. The output of the amplifier 35 is connected to the base electrode of a transistor 36, the collector electrode of which is connected to the centertap of the transformer 60 and the emitter electrode of which is connected to the inverting input of the amplifier 35 and via a resistor 37 to the supply $-V_1$.

Referring to FIG. 9, high and low band expandors are connected in series between an input port 2 and an output port 3. The expandor circuits are virtually identical and hence only the high band expandor is described in detail with emphasis only on the differences between the two circuits.

The input port 2 is connected across the primary winding of a coupling transformer 63, the secondary winding of which is connected to the non-inverting inputs of differential amplifiers 100 and 101. The coupling transformer 63 also includes a tertiary winding connected between ground and the input of a high pass filter 46 and a low pass filter 41. These filters, 41 and 46, are of the same construction as shown in FIG. 8. The output of the high pass filter 46 is connected to a full wave rectifier 31. The output of the rectifier 31 is connected in series with a diode 32, followed by a smoothing filter 34, to the non-inverting input of a differential amplifier 38. A potentiometer 72 is connected between a negative voltage supply $-V_1$ and ground. The movable arm of the potentiometer 72 and a voltage clamp 71 are also connected to the non-inverting input of the amplifier 38. The output of the amplifer 38 is connected to the centertap of the secondary winding of the transformer 63. The circuit elements just described, 31, 32, 34, 78, 71 and 72 constitute a control unit for controlling the operation of the high band expandor.

The amplifiers 100 and 101 have outputs connected to the base electrodes of transistors 102 and 103 respectively. The emitter electrodes of the transistors 102 and 103 are each connected in aiding current series relationship with a series string of diodes 12. Both series strings of the diodes 12 terminate at a resistor 106, the other end of which is connected to the supply $-V_1$.

A pair of transistors 96 and 97 each include emitter electrodes connected to a voltage supply $-V_2$, more negative than the supply $-V_1$, via resistors 98 and 99 respectively. The base electrode of each transistor 96 and 97 is connected to the supply $-V_1$. The collector electrode of the transistor 96 is connected to the emitter electrode of the transistor 102 and to the inverting input of the amplifier 100. The collector electrode of the transistor 97 is connected to the emitter electrode of the transistor 103 and to the inverting input of the amplifier 101.

Amplifiers 88 and 89 each have an output connected to opposite ends of a primary winding of a coupling transformer 64 and to their respective inverting inputs. The non-inverting input of the amplifier 88 is connected to the collector electrode of the transistor 102. The non-inverting input of the amplifier 89 is connected to the collector electrode of the transistor 103.

In the high band expandor a low pass network 26*c* is connected between the emitter electrodes of the transistors 102 and 103. A low band expandor is provided by the substitution of the high pass network 21*c*, and the low pass filter 41. The high pass network 21*c* includes a capacitor 23 in series with a resistor 22. The low pass network includes a resistor 28 an inductor 27 and a d-c blocking capacitor 29, all in series.

In operation of the compressor circuits in FIG. 8, signals passed by the low pass filter 41 and the high pass filter 46 are fed to the rectifiers 31 in the low band and high band compressor respectively. In each compressor the output of the rectifier 31 is isolated from the on-following circuitry by the diode 32. The signal is smoothed and provided with a relatively fast rise time constant and a slow fall time constant by the smoothing circuit 33. The voltage clamp 71 provides a minor circuit improvement to prevent the signal from falling below the predetermined minimum. The elements 35–37 provide a current source responsive to the signal from the smoothing circuit to provide, at the collector of the transistor 36, a current proportional to the signal as determined by the value of the resistor 37, in a well known manner. Disregarding for the present, the current sources 86, 87 and 90, the current at the collector electrode of the transistor 36 is conducted by the resistor 94 and accordingly determines a voltage at the centertap of the transformer 60. This voltage appears at the non-inverting inputs of the amplifiers 80 and 81 which again in a well known manner accordingly determines the operating points of the amplifiers 80 and 81, which function as voltage followers. The operating points determine the currents at the collector electrodes of the transistors 82 and 83, according to the values of the resistors 84 and 85 respectively. The resistors 84 and 85 carry substantially all the effective operating currents of the elements 80 and 82, and of the elements 81 and 83 respectively. The resistor 84, 85 and 94 are preferably very closely matched in resistance so that the three above mentioned currents will be virtually identical. The collector electrodes of the transistor 82 and 83 act as current sources to present a high source impedance to the series strings of diodes 12 which consequently provide an impedance to the $-V_1$ supply substantially in an inverse logarithmic relationship to the current flow. The supplies $-V_1$ and $-V_2$ each effectively provide an AC ground.

AC signals appearing at the input port 2, for example audio radio program signals, are coupled to the amplifiers 80 and 81, via the transformer 60, in a 180° phase relationship. These signals are provided as current signals at the collector electrodes of the transistors 82 and 83, again 180° out-of-phase. The voltages of these signals are determined by the operating impedance of the strings of series diodes 12. The voltages are amplified with unitary gain in the amplifiers 88 and 89 and applied across the primary winding of the coupling transformer 61.

As the signals at the collector electrodes of the transistors 82 and 83 are 180° out-of-phase, the impedance of the high pass network 21*c* can effectively be considered as being in parallel with each of the series strings of diodes 12. Above a certain signal frequency, the network 21$c$ and the diodes 12 provide a decreasing impedance to effect a roll off of about 6 db. per octave in signals appearing at the transformer 61. An upper frequency at which the network impedance no longer decreases is determined by the resistance of the resistor 22. Hence, below a first certain frequency, attenuation of the signals is determined by the operating impedances of the series diodes 12. Above a second certain frequency, attenuation is determined by the network impedance. In the frequency range between the two certain frequencies, the attenuation is determined by a combination of the network 21$c$ and diodes 12 impedances. These operational parameters are illustrated in principle in FIG. 3, in the curves labelled as relating to "Response of Low Frequency Variolossers". The signal compression function is provided predominately according to lower frequency signals from the transformer 62 as limited by the low pass filter 41.

The high band compressor functions identically as does the low band compressor, however in this case it is signals below said certain frequency which are attenuated predominately as determined by the resistor 28 in the network. Between the first and second certain frequencies the diodes 12 impedance and the low pass network 26$c$ impedance determined the attenuation of the signals. Above said second frequency the signal attenuation is determined solely by the diode impedance. These operating parameters are illustrated in principle in FIG. 3 by the curves labelled as relating to "Response of High Frequency Variolosser".

The signal compression function is provided predominately according to higher frequency signals from the transformer 62 as limited by the high pass filter 46. With reference to FIG. 3, the roll-off characteristics of the filter 41 and 46 are preferably arranged to intersect about coincident with the curves $a$.

As the impedance of the diodes 12 in each band compressor is determined by signals of only part of the overall operating band, the transistor 82 and 83 may be subjected to high amplitude signals outside of that band. If the current in these transistors happens to be relatively low, clipping of the high amplitude signal will result. To overcome this problem current source 90 provides a base level current which determines a base level voltage at the center tap of the transformer 60. This base level voltage is sufficient to cause the transistors 82 and 83 to conduct a base level current. Hence a minimum current operating operating point is established in both the transistors to avoid clipping of high level out-of-band signals. This base level current is prevented from passing through the diodes 12 by the current sources 86 and 87, which abstract, ideally, current in the exact amount of the base level current from the collector electrodes of the transistors 82 and 83 respectively. Hence the operating impedances of the diode series strings 12 are substantially unaffected by the base level currents.

The voltage clamp 71 yields a minor improvement in circuit operation. It provides a minimum voltage in the event that almost no signals are passed by the associated filter 41 or 46 as the case may be. This minimum voltage functions to prevent the series strings of diodes 12 from being in a non-conducting state. This non-conducting state is avoided because at or near the threshold of conduction there is often a severe imbalance in the operating impedances of the respective strings of diodes 12. Such an imbalance would introduce distortion into the signals being processed. In addition such operation would tend to introduce some noise into the output signals from the variolosser. The voltage clamp 71 hence is used to set a maximum diode impedance sufficiently removed from the threshold of conduction of the diodes to avoid any series imbalance and significant noise generation.

Referring to FIG. 9, the expandor circuit illustrated operates inversely to the compressor circuit in FIG. 8. In FIG. 8, current was the controlling factor with a resulting voltage being directly utilized. In FIG. 9 a voltage is established across the series strings of diodes 12 and the resulting current develops a voltage across the resistors 104 and 105. The AC signal portion of this voltage represents the expanded signal.

In more detail, a typical compressed signal applied at the input port 2, is coupled to the amplifiers 100 and 101 in a 180° phase relationship. The full wave rectifier 31 rectifies signals passing through the filter 46 from the transformer 63. The rectified signal is isolated across the diode 32 and smoothed in the smoothing circuit 34. The smoothed signal is amplified by the differential amplifier 38 in relation to the voltage appearing at the cathode ends of the strings of diodes 12. The voltage resulting at the output of the amplifier 38 is coupled to the positive inputs of the amplifiers 100 and 102 via the center tap of the transformer 63. The combined elements 100, 102 and 101, 103, each function as a voltage follower and hence the emitter of the transistors 102 and 103 each present a low source impedance to the strings of diodes 12. The diodes 12 in turn provide a negative feedback gain control for the AC signals developed across the resistors 104 and 105. When the control voltage is quite negative, little control current flows in the diodes 12. The resulting high impedance acts to limit the signal gain of the transistor 102 and 103. On the other hand a more positive control voltage decreases the diode impedance, allowing a much greater AC signal voltage to appear across the resistors 104 and 105 and be applied to the transformer 64.

The networks 26$c$ and 21$c$ each provide for substantially no negative feedback in their passband regions of operation and in the expandor circuit result in providing a maximum and nearly constant gain for signals in the passband region. The capacitor 29 in the low pass network 26$c$ is used to provide DC blocking, however in a well balanced circuit it may be unnecessary. The expandor circuits have operating characteristics in principle similar to those illustrated in FIG. 5.

The transistors 96 and 97 act as current drains to cause the transistors 102 and 103 to operate at sufficient current to avoid the limiting problem discussed in relation to FIG. 8. These current drains have substantially no effect upon the voltage at the emitter electrode of the transistor 102 and 103. The voltage clamp 71 provides, as in FIG. 8, that the diodes 12 are prevented from closely approaching in operation their forward conductive threshold. The potentiometer 72 provides for minor voltage adjustment to adjust tracking of the expandor circuit to a predetermined value. A 5 megohm potentiometer has been found suitable.

Referring to FIG. 10 a modification of the high pass network 21$c$ provides a high pass network 21$d$ and includes a parallel arrangement of a resistor 25$a$ and an inductor 24$a$, connected to the capacitor 23. Similarly, a parallel arrangement of a resistor 25$b$ and an inductor 24$b$ is connected to the resistor 22. This modification has the effect of slightly increasing the impedance of the network at frequencies within the upper portion of its passband characteristic. When this modified high pass network 21*d* is substituted for the network 21*c* in FIGS. 8 and 9, operating characteristics are obtained similar to those shown in FIG. 11. The graph in FIG. 11 includes a horizontal axis representing frequency on a non-lnear scale. The right hand vertical axis of the graph represents compressor circuit and expandor circuit input. The left hand side of the graph respresents compressor circuit and expandor circuit output. The curves C relate to compressor operation using the network in FIG. 10 with the resistor inductor parallel arrangements connected to the collector electrodes of the transistor 82 and 83, with the remainder of the network connected to the series strings of diodes 12, as before described. The curves E relate to expandor operation using the network in FIG. 10 with the resistor inductor parallel arrangements connected to the emitter electrodes of the transistors 102 and 103, with the remainder of the network connected to the series strings of diodes 12 as before described.

For example, a compressor input signal input of 0 db. produces a 0 db. output at lower frequencies and a +3 db. output at higher frequencies. Considering the expandor, an input signal of 0 db. produces a 0 db. output at lower frequencies and a −3 db. output at higher frequencies. This is the compliment of the compressor operation.

It was found that this modification provides a further improvement in the signal to noise ratio in the higher frquencies of audio programming. Typically the majority of program signal energy lies in the lower portion of the operational frequency band. Hence the maximum signal amplitude in the high frequency portion of the operating audio band tends to be substantially lower, even after compression, than do the lower frequency signal amplitudes. Hence in the upper frequency regions, the maximum signal carrying cability of the current facility between the compressor and the expandor was unused. The modified network in FIG. 10 provides more gain for the high frequency signals in the compressor, to further improve the signal to noise ratio in the high band. Use of this same network in the expandor provides a complementary gain situation, as described above, to restore the signals to their original form.

It will be noted in looking in FIGS. 8 and 9 that in various parts of the circuitry, a differential amplifier is often used to drive the base electrode of a transistor, with the inverting input of the differential amplifier connected to the emitter electrode of the tranistor. As before mentioned, this is a typical voltage follower configuration. This form of circuitry is used often where a simple transistor would normally be sufficient. However if the circuit is thus simplified one must ensure that in most cases, the current gain of each transistor is matched with the others and also that the thermally caused variations of the operating characteristics are also well matched. Otherwise degradation of companding operation will result from, for example unequal currents from the current sources 86, 87 and 90. The present example embodiment through the use of voltage follower circuits as illustrated, does not require matched characteristics and also tolerates unequal temperatures between different active devices. A further but minor improvement in circuit operation can be gained by replacing each of the transistors, in the voltage follower configuration, by a Darlington arrangement or equivalent circuit.

In each of the described embodiments, except in FIG. 1, a compressor circuit is illustrated with its control function derives from signals appearing at the output of thc compressor. Also expandor circuits are illustrated as deriving control functions from signals appearing at the input. In FIGS. 8 and 9, such connection of the control units provides about a 2:1 compression and expansion ratio.

Referring to FIG. 12, high-band, intermediate-band and low-band compressors 110, 120 and 130, including low-pass, intermediate stop-band, the high-pass networks 151, 152 and 153 respectively, are connected in tandem between a signal source and a circuit facility 300. Signals from the output of the low-band compressor 130 are fed back to the compressor 110, 120 and 130 via high-pass, intermediate band-pass and low-pass filters 161, 162 and 163 respectively, to provide control for each of the compressor circuits. Low-band, intermediate-band and high-band expandors, 230, 220 and 210, include high-pass, intermediate stop-band and low-pass networks 153, 152 and 151 respectively, and are connected in tandem between the circuit facility 300 and a signal load. Signals at the input of the expandor 230 are also connected via low-pass, intermediate band-pass and high-pass filters 163, 162 and 161 to provide control for each of the compressor circuits 230, 220 and 210 respectively.

Figures 13A, 13B, 13C, 13D, 13E, 13F:
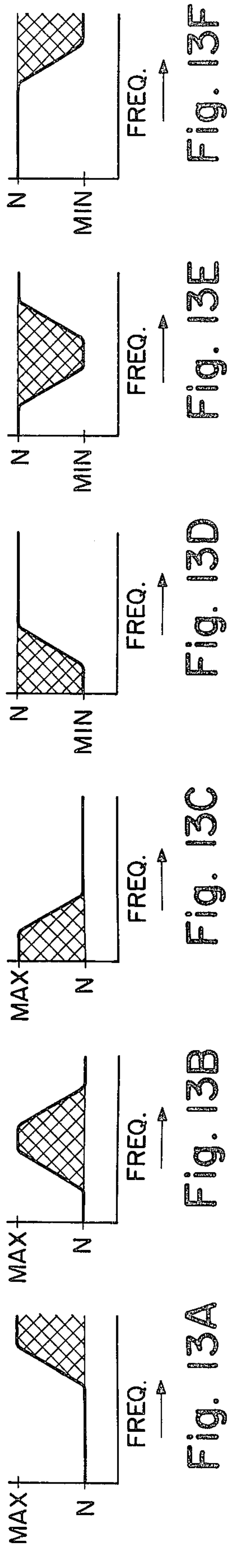

FIGS. 13A – 13F each include a horizontal axis representing frequency on a non-linear scale. FIGS. 13A – 13C each include a vertical axis representing gain between nominal and maximum levels. FIGS. 13D – 13F each include a vertical axis representing gain between nominal and minimum levels. FIGS. 13A – 13C illustrate the general operating characteristics of compressor circuits 110, 120 and 130 respectively in FIG. 12. FIGS. 13D – 13F illustrate the general operating characteristics of the expandor circuits 230, 220 and 210 respectively. The three-band compandor provides further companding improvement, in broader band operating situations. Each expandor and compressor is described in the foregoing as having variolossers with adjacent operational bands to provide a continuous operational frequency range. Should the situation require it, a discontinuous frequency range of operation, is provided by arranging the various networks to provide for one or more gaps in frequency between the various operational frequency bands of the variolossers.

What is claimed is:

1. An alternating current signal processing circuit, for use in a compandor and havaing input and output ports, comprising:

a plurality of variolossers, each having a variable gain characteristic;

buffer amplifier means residing between the variolossers in the plurality of variolossers, for providing impedance isolation between the variolossers, the variolossers connected in tandem between the input and output ports via the buffer amplifier means;

a filter network in combination with each variolosser, for limiting the variable gain characteristic of the variolosser to a mutually exclusive operational band of frequencies as determined by the stop band characteristic of the filter network, and providing a nearly constant gain characteristic for other frequencies as determined by the pass band impedance of the filter network;

a separate control unit associated with each variolosser, for generating a control signal for controlling the associated variolosser, each control unit having an input, the inputs connected in common one with the other and to one of said ports, each control unit being responsive to alternating current signals having frequencies in the mutually exclusive band of frequencies of the variolosser associated therewith and appearing at the input of the control unit;

whereby the relative dynamic range of the alternating current signals, of frequencies falling within the operational frequency band of each variolosser, is altered according to the response of the control units to the alternating current signals and the response of the variolossers to the control signals.

2. A signal processing circuit as defined in claim 1 in which the filter network having the lowest stop band characteristic includes means for limiting the conductance of the network in the upper portions of its passband characteristic.

3. An alternating current signal processing circuit as defined in claim 1 in which each filter network is a first order filter network having mutually distinct pass band and stop band characteristics and a transitional region therebetween having a predetermined slope characteristic common to each of the filter networks; and in which:

each control unit includes a second order filter circuit having a pass band, a stop band and a transitional region therebetween having a slope greater than the predetermined slope of the transitional region of the associated first order filter network, and intersecting with the transitional region of the associated first order filter network, the control unit being responsive to alternating current signals passed by the second order filter circuit to provide the control signal.

4. A signal processing circuit as defined in claim 1, in which the variolossers each comprise:

first and second current amplifiers having inputs for the application of balanced signals thereto so as to be driven in opposite phase by the signals to the variolosser, and responsive to the control current from the control unit whereby the operating points of the current amplifiers are controlled;

first and second diode elements connected between an alternating current ground and the outputs of the first and second current amplifiers respectively, whereby the impedance of each diode element is determined by the current conducted therethrough;

the filter network connected between the outputs of the first and second current amplifiers; and in which the buffer amplifier means includes:

inputs connected to the outputs of the first and second current amplifiers, the processed output signals from the variolosser appearing at the output of the buffer amplifier means.

5. A signal processing circuit as defined in claim 4 in which each control unit comprises:

a filter means having a passband characteristic substantially corresponding to the stop band of the filter network connected between the first and second current amplifiers;

means for generating a control current substantially in response to the amplitude envelope of signals passed by the filter means;

means for providing a minimum control current, to prevent the impedance of the diode elements for exceeding a certain maximum value.

6. A signal processing circuit as defined in claim 4 further comprising in combination with each variolosser;

a first current source connected to the variolosser, for biasing said first and second current amplifiers to operate at a predetermined level of conduction in addition to the level of conduction at said operating points, as determined by the control unit;

second and third current sources connected to the outputs of the first and second current amplifiers respectively, the second and third current sources conducting currents substantially in the amount of the predetermined level of conduction;

whereby the first and second current amplifiers are maintained in substantially linear area of their operating characteristics, the current resulting from said predetermined level of conduction being isolated from the diode elements, to provide for linear amplification of those signals having frequencies outside of the frequency responsive range of the control unit.

7. A circuit as defined in claim 4 in which the filter network, connected with one of the variolossers, has a high passband characteristic, and includes limiting means for limiting to a degree the conductance of the network in the upper portion of its high pass band characteristic.

8. A signal processing circuit as defined in claim 1 in which the variolossers each comprise:

first and second voltage amplifiers having inputs for the application of balanced signals thereto, so as to be driven in opposite phase by the signals applied to the variolosser, and responsive to a control voltage from the control unit whereby the operating points of the voltage amplifiers are controlled;

first and second diode elements connected between a first alternating current ground and the outputs of the first and second voltage amplifiers respectively, whereby the impedance of each diode element is determined by the current conducted therethrough;

first and second resistances connected between a second alternating current ground, of a different direct current potential than the first alternating current ground, and the first and second voltage amplifiers respectively, each resistance conducting substantially all the operational current of its associated voltage amplifier;

the filter network connected between the outputs of the first and second voltage amplfiers; and in which the buffer amplifier means includes:

an input connected to the junction between the first resistance and the first voltage amplifier, and an input connected to the junction between the second resistance and the second voltage amplifier, the processed signals from the variolosser appearing at the output of the buffer means.

9. A signal processing circuit as defined in claim 8 in which the control unit comprises:

a filter means having a passband characteristic substantially corresponding to the stop band of the filter network connected between the outputs of the first and second voltage amplifiers;

means for generating a control voltage substantially in response to the amplitude envelope of signals passed by the filter means;

means for providing a minimum control voltage to prevent the impedance of the diode elements from exceeding a certain maximum value.

10. A signal processing circuit as defined in claim 8 further comprising:

first and second current sources connected to the outputs of the first and second voltage amplifiers respectively, the current sources each conducting a certain current to cause the voltage amplifiers to operate at a predetermined level of conduction, in addition to the levels of conduction at said operating points as determined by the control unit, whereby the first and second voltage amplifiers are maintained in substantially linear areas of their operating characteristics, to provide for linear amplification of those signals having frequencies outside of the frequency responsive range of the control unit.

11. A circuit as defined in claim 8 in which the filter network, connected with one of the variolossers, has a high passband characteristic, and includes limiting means for limiting to a degree the conductance of the network in the upper portion of its high passband characteristic.

12. An alternating current signal processing circuit for providing a companding function for a circuit facility and comprising:

a compressor portion including at least two balanced varioloser circuits, connected in tandem between an input port and an output port connected to the circuit facility, each variolosser circuit comprising:

first and second current amplifiers, responsive to a balanced alternating current signal applied between the inputs of the current amplifiers, and responsive to a control current;

first and second diode elements connected between an alternating current ground and the outputs of the first and second current amplifiers respectively whereby the impedance of each diode element is varied according to the current conduction therethrough;

a buffer amplifier means having inputs connected to the outputs of the first and second current amplifiers, and having an output;

means for providing a minimum control current to cause the first and second current amplifiers to conduct minimum operational currents in a linear region of their operating characteristics;

means connected to the first and second current amplifiers for conducting currents substantially in the amounts of the minimum operational currents caused by said minimum control current whereby the impedances of the diode elements are unaffected by said minmum operational currents;

a filter network connected between the outputs of the first and second current amplifiers, in one case the filter network having a low pass characteristic to provide a high band compressor function, in the other case the filter network having a higher pass characteristic to provide a lower band compressor function, adjacent in frequency to the high band compressor function;

a control unit for providing the control current additively with said minimum control current, and having an input connected to said output port, the control unit providing the control current in response to the amplitude envelope of the alternating current signals having frequencies in the stop band of the filter network in the associated variolosser; and an expandor portion including balanced variolosser circuits of the same quantity as in the compressor portion, and connected in tandem between an innput port connected to an output of the circuit facility, and an output port, each variolosser circuit comprising:

first and second voltage amplifiers, responsive to a balanced signal applied between the inputs of the voltage amplifiers, and responsive to a control voltage;

first and second diode elements connected between a first alternating current ground and the outputs of the first and second voltage amplifiers respectively whereby the impedance of each diode element is varied according to the current conduction therethrough;

first and second resistances connected between a second alternating current ground, of a different direct current potential than the first alternating current ground, and the first and second voltage amplifiers respectively, to conduct substantially all the operating current of the voltage amplifiers;

buffer amplifier means having an input connected to the junction between the first resistance and the first voltage amplifier and an input connected to the junction between the second resistance and the section voltage amplifier, and having an output;

means for abstracting certain current from the outputs of the first and second voltage amplifiers, to cause the voltage amplifiers to operate in linear areas of their operating characteristics;

a filter network connected between the outputs of the first and second voltage amplifiers, the filter networks in the expandor portion being substantially identical in operating characteristics to the filter networks of said one and other cases in the compressor portion, thereby providing high-band and lower band expandor functions in the expandor portion;

a control unit for providing the control voltage and having an input connected to the input port of the expandor portion, the control unit providing the control voltage in response to the amplitude envelope of the alternating current signals, having frequencies in the stop band of the filter network in the associated variolosser.

13. A signal processing circuit as defined in claim 12 in which the variolossers providing said lower band compressor and expandor functions include a high frequency impedance element in series with the outputs of each of the current and voltage amplifiers therein, whereby the constant high frequency attenuation of the lower band variolosser circuits for frequencies somewhat remote the stop band in the associated filter networks is to a degree restrained, to maintain a disproportionately higher signal level in the circuit facility for signals having frequencies in the upper portion of the passband of the filter networks.

* * * * *